United States Patent [19]

Nehmann

[11] 3,805,116

[45] Apr. 16, 1974

[54] CHASSIS FOR SUPPORTING REMOVABLE CIRCUIT COMPONENTS OF TEMPORARY ELECTRIC OR ELECTRONIC CIRCUITS

[75] Inventor: Euchar Nehmann, Leinfelden-Unteraichen, Germany

[73] Assignee: Franckh'sche Verlagshandlung W. Keller & Co., Stuttgart, Germany

[22] Filed: Jan. 22, 1973

[21] Appl. No.: 325,635

[30] Foreign Application Priority Data

Feb. 1, 1972 Germany............................ 2204559

[52] U.S. Cl............. 317/99, 317/101 CC, 317/118, 339/18 B, 339/258 R

[51] Int. Cl............................................... H02b 1/04

[58] Field of Search......... 317/99, 101 CC, 101 CP, 317/118, 120; 339/18 B, 19, 217 S, 258 R, 258 P

[56] References Cited

UNITED STATES PATENTS

| | | | |
|---|---|---|---|
| 3,085,177 | 4/1963 | Thompson | 317/101 CC |
| 3,351,891 | 11/1967 | Schneck | 339/217 S |
| 3,617,980 | 11/1971 | Alkire | 339/258 R |
| 3,001,171 | 9/1961 | Schultz | 339/19 |
| 2,549,725 | 4/1951 | Uline | 317/118 |

*Primary Examiner*—Robert K. Schaefer
*Assistant Examiner*—Gerald P. Tolin
*Attorney, Agent, or Firm*—Spencer & Kaye

[57] ABSTRACT

A chassis which removably supports conductors and circuit components that constitute temporary electric or electronic circuits, includes a plurality of one-piece resilient connector clips each having a housing visible from the outside of the chassis and provided with apertures. From the walls of the housing there extend inwardly directed contact tongue pairs, each aligned with an aperture in the housing. Conductors or terminals of circuit components are insertable in between the contact tongues of a contact tongue pair either through an aperture provided in the clip housing or from that side of the clip housing which is remote from the apertures.

11 Claims, 8 Drawing Figures

CHASSIS FOR SUPPORTING REMOVABLE CIRCUIT COMPONENTS OF TEMPORARY ELECTRIC OR ELECTRONIC CIRCUITS

BACKGROUND OF THE INVENTION

This invention relates to a chassis assembly on which electric or electronic circuits may be built and is of the type that has internally disposed resilient metallic connector clips for receiving electric conductors and terminals of other circuit components.

Chassis of the aforeoutlined type serve primarily for experiments that are performed, for example, with educational toys or are conducted in practical research work in industrial or university laboratories.

Known chassis of the above type have a number of disadvantages. For example, the course of the conductors forming part of the circuit constructed cannot be easily followed visually. Further, the maximum number of circuits that can be built is limited, for example because of an insufficient number of contact stations. Also, at the available contact stations formed usually by resilient connector clips, undesirably high contact resistances appear or the inserted conductors and other circuit components are secured only in an insufficient manner.

SUMMARY OF THE INVENTION

For the purpose of eliminating the above-outlined disadvantages, it is an object of the invention to provide an improved chassis of the above-mentioned type which permits the building of a great variety of circuits that are laid out in an easily observable manner and in which the conductors and circuit components are securely held by the resilient connector clips and the contact resistances are substantially reduced.

Briefly stated, according to the invention, this object as well as others are accomplished by forming the resilient connector clips as one-piece elements inserted into the downwardly open chassis and visible from the outside. Each resilient connector clip includes a clip housing formed of spaced lateral walls and a web interconnecting the walls. The web is provided with at least one aperture. Each resilient connector clip has at least two cooperating contact tongues having free end portions of arcuate shape. Conductors or terminals of circuit components may be introduced between the contact tongues either through the apertures provided in the web or from that side of the clip housing which is remote from the web.

The invention will be better understood and further objects as well as advantages become more apparent from the ensuing detailed specification of several preferred, exemplary embodiments taken in conjunction with the drawings.

DESCRIPTION OF THE PREFERRED EMBODIMENTS

Figures 1, 8:
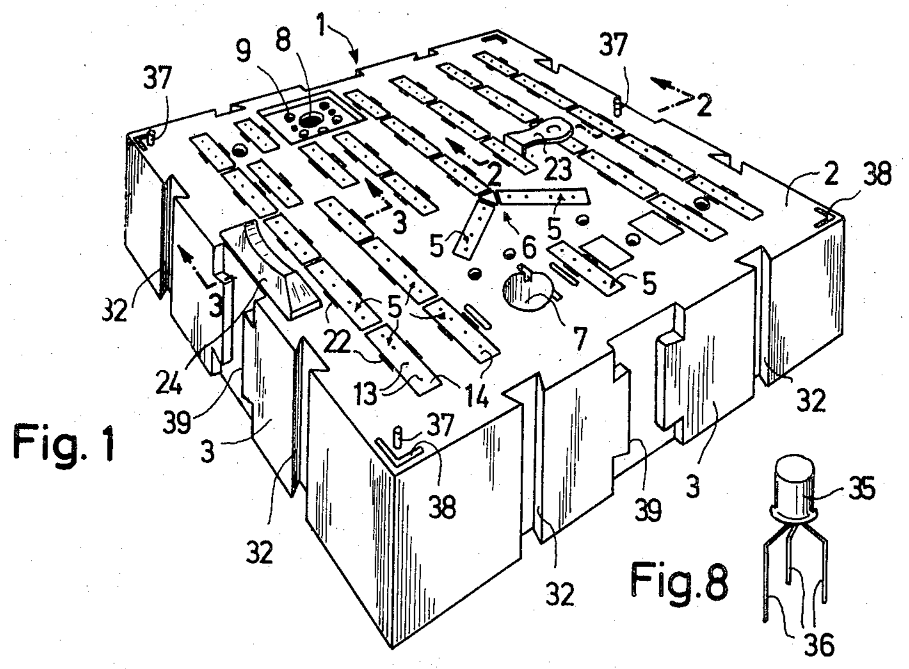
FIG. 1 is a perspective view of a chassis according to the invention.
FIG. 8 is a perspective view of a conventional transistor constituting a circuit component.
Figure 2:
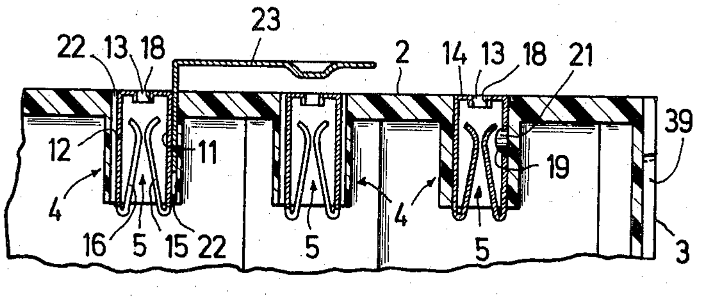
FIG. 2 is a sectional view along line 2—2 of FIG. 1.
Figure 3:
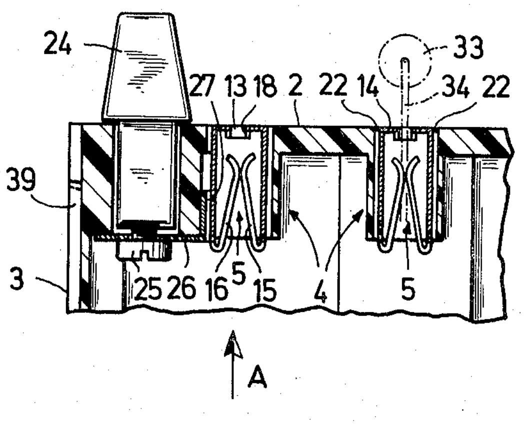
FIG. 3 is a sectional view along line 3—3 of FIG. 1.

Turning now to FIGS. 1, 2 and 3, there is illustrated a box-like chassis 1 of preferably rectangular or quadratic configuration having a top wall 2 and four lateral walls 3. In case several chassis 1 are to constitute a chassis assembly, the chassis may have varying dimensions preferably matched with one another. The internally hollow chassis 1 has an open underside that faces the inner face of the top wall 2. In the inside of the chassis 1 there may be disposed batteries or other current sources attached by appropriate securing means (not shown). From the inner face of top wall 2 there extend inwardly oriented, open-ended compartments 4 which have a rectangular cross section and which serve for receiving one-piece resilient connector clips 5 to be described hereinafter in greater detail. The resilient connector clips 5, which are made of a metal of good electric conductivity such as copper, brass or the like, are arranged in the compartments 4 in such a manner that they are visible from the outside as may well be observed in FIG. 1. Usually the resilient ient connector clips 5 are disposed in parallel rows; it is, however, feasible to arrange them in a star-like or other configuration for particular purposes. A star-like arrangement of three resilient connector clips 5 is designated at 6 in FIG. 1. The chassis 1 and the compartments 4 are made of electrically insulating, preferably synthetic material. The compartments 4 provide electric insulation for the individual resilient connector clips 5. In addition to the compartments 4 the chassis 1 has a socket 7 for an electric bulb, apertures 8, 9 for the mounting of transformers, light-dependent resistor housings, coils, or the like and angular slots 38 for receiving complementally shaped tabs of a dust cover (not shown). Also, there may be provided supports for rotary knobs as well as other receiving means for electrical or mechanical elements.

Figures 5, 6, 7:
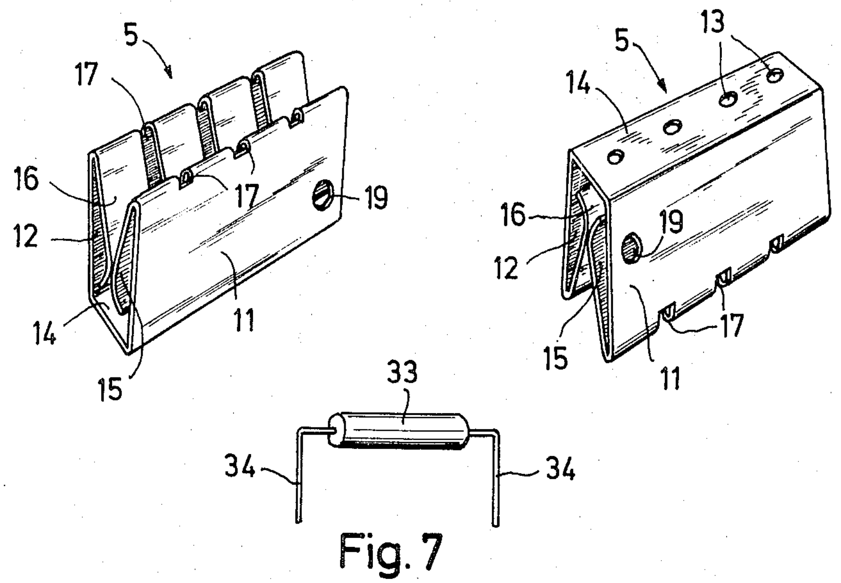
FIG. 5 is a perspective view of a resilient connector clip according to the invention.
FIG. 6 is a perspective view from another direction of the resilient connector clip illustrated in FIG. 5.
FIG. 7 is a perspective view of a conventional resistor constituting a circuit component.

Referring now to FIGS. 5 and 6, each resilient connector clip 5 comprises a clip housing which in essence is formed of two side walls 11, 12 and a web 14 interconnecting the same at one of their ends. The web 14 is provided with a series of throughgoing apertures 13. From the other ends of the side walls 11 and 12 there extends a plurality of contact tongues 15 and 16 arranged in pairs. The contact tongues 15, 16 of each pair are oriented inwardly towards one another and in the direction of the web 14. Each contact tongue 15, 16 has an arcuate free end portion. The contact tongues 15 extending from the side wall 11, as well as the contact tongues 16 extending from the side wall 12 are separated from one another by slots 17 which ensure that the individual contact tongues can execute a springing motion of relatively large amplitude. Each contact tongue pair 15, 16 is aligned with an aperture 13. When a conductor is inserted into an aperture 13, it will arrive between the arcuate end portions of the cooperating contact tongues 15, 16 of the contact tongue pair associated with that aperture and will be held securely while simultaneously a bilateral electric contact is established and maintained. A conductor may also be introduced from below, that is, from that side of the clip housing which is remote from the web 14.

The apertures 13 may be provided by stamping. It may be desirable to expand the apertures 13 by means of a mandrel and thus give the aperture a deep-down configuration as illustrated in FIG. 2. In this manner the aperture 13 continues in an inwardly and downwardly oriented short tubular guide 18 that directs the introduced conductor securely in between the contact tongues 15, 16.

At least one of the side walls 11 or 12 of the clip housing is provided with an opening 19 into which snaps a pin 21 (FIG. 2) attached to the inner wall of the compartment 4 when the resilient connector clip 5 is inserted thereinto. In this manner the resilient connector clip 5 is safely secured to the chassis 1, but may be removed therefrom by pressing the two side walls 11 and 12 to one another and then pulling out the resilient connector clip.

As seen in FIGS. 1–3, the inner walls of the compartments 4 are provided with channel-like open-ended pockets 22 in the zone of which the side walls 11 and 12 of the clip housing are spaced from the walls of the compartment 4. Into the gap bounded by the wall of a packet 22 and the outer face of a side wall 11 or 12 there may be inserted, either from above or from below, contact or circuit components which will thus engage the clip housing and establish an electrical contact therewith. An exemplary circuit component of this type is shown in FIGS. 1 and 2; it is in the form of an angularly bent resilient metal key 23. One leg of the key 23 is introduced into a pocket 22 in such a manner that its other leg may be pressed – against the resilient force of the metal – onto the web 14 of an adjacent resilient connector clip 5. In this manner, between two adjacent resilient connector clips 5 an electric contact may be established and maintained as long as the key 23 is depressed. In the enlargements 22 of two or more adjacent insert sleeves 4 containing contact springs 5 there may also be inserted stationary contact rails which electrically connect two or more contact springs 5.

Figure 4:
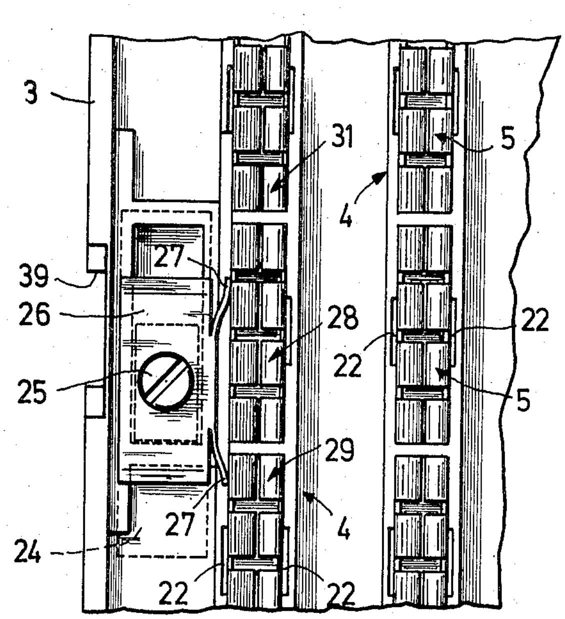
FIG. 4 is a fragmentary bottom view of the structure illustrated in FIG. 1.

As shown in FIGS. 1, 3 and 4, in a guide slot provided in the chassis 1 there is shiftably supported a sliding switch knob 24 to which there is attached, by means of a screw 25, a contact member 26. The latter, as shown in FIG. 4, has at its side two integral, electrically conducting fingers 27. By shifting the knob 24, an electric contact may be established selectively either between the resilient connector clips 28 and 29 or between the resilient connector clips 28 and 31, as also well seen in FIG. 4. In the knob position as illustrated in FIG. 4, it is the two resilient connector clips 28 and 29 which are electrically connected with one another by the fingers 27. The latter lie against the preferably smooth outer faces of the side walls of the resilient connector clips and slide therealong as the switch knob 24 is displaced.

Turning once again to FIG. 1, the chassis 1, has, in its lateral walls 3, grooves 32 which have a dovetail-shaped cross section and which serve for receiving complementally shaped connecting members **32*a*. By means of the latter which may be of angularly bent configuration, several chassis may be interconnected in horizontal, vertical or even oblique arrangements to form a chassis assembly. The aforedescribed attachment may be effected laterally, downwardly or upwardly with respect to the chassis 1. The dovetail grooves 32 further permit the attachment of non-electrical components, so that the chassis 1 may for example find application in mechanical construction sets as well. The lateral walls 3 of the chassis 1 also include I-shaped grooves 39. If in two such aligned grooves of two adjoining chassis 1** a strip of complemental configuration is inserted, a vertical displacement of the two chassis is effectively prevented.

In use, terminal wires of the electrical circuit components or electrical connecting conductors are introduced by their ends usually from the outside of the top wall 2 into the apertures 13 of the resilient connector clips to such an extent until each is disposed between the arcuately shaped ends of a contact tongue pair 15, 16 where it is securely held while simultaneously a bilateral electric contact is established and maintained.

Turning now to FIG. 7, there is shown a conventional, commercially available electric resistor 33 having terminal wires 34 which are angularly bent in such a manner that the free ends thereof correspond exactly to the distance between the apertures 13 of two adjacent resilient connector clips. In this manner the terminal wires 34 of the resistor 33 may be inserted in the apertures 13 as it is indicated in phantom lines in FIG. 3.

In FIG. 8 there is illustrated another conventional, commercially available circuit component in the form of a transistor 35 having three terminal wires 36 which extend from the transistor 35 at an angle of 120° from one another. These terminal wires 36 are bent downwardly in such a manner that they may be inserted into the adjoining first apertures 13 of the three resilient connector clips 5 arranged in a star-like configuration.

The resilient connector clips 5 are preferably so distributed on the chassis 1 that the circuit components such as a resistor 33 or a transistor 35 may be arranged in the same manner as they appear in the diagram of the circuit to be built. The paper or cardboard sheet showing the diagram of the circuit to be built may be used as an overlay. For this purpose, the sheet is provided with the necessary openings for the conductors and circuit components and may be immobilized on the chassis 1 by pins 37 that are provided on the top wall 2 of the chassis 1. The overlay is provided with holes which are brought into alignment with the pins 37.

Usually the circuit is built on the outer face of the top wall 2 where, as it was said earlier, the webs 14 of the resilient connector clips 5 are visibly exposed. By virtue of the particular configuration of the resilient connector clips 5, it is also possible to introduce the circuit components or conductors from below inbetween the contact tongues 15, 16, in which case then the circuit components are disposed inside the chassis 1. The circuit components to be arranged inside the chassis 1 advantageously have flat terminals, for example leaf contacts which, when inserted, may extend along more than one contact pair 15, 16 of one resilient connector clip 5.

SUMMARY OF THE ADVANTAGES OF THE CHASSIS ACCORDING TO THE INVENTION

The course of the electric conductors of the circuit disposed on the outer face of the top wall of the chassis is directly visible.

By disposing the contact tongues inside the clip housing, the resilient conductor clips have a plain, even outer face, so that they will not become entangled either during manufacturing or storage. This facilitates the use of automatic filling or counting devices.

Even if the conductor is inserted into the resilient connector clip only to the extent of a few millimeters, a secure electric contact is effected by the contact tongues. Since the latter have a relatively large springing amplitude, conductors of widely varying thicknesses may be used and each time a good electric contact is ensured. The same applies to soft or stranded wires.

The resilient connector clips may receive conductors or contact elements not only from above but, when required, also from below.

The contacting of the introduced conductors is effected bilaterally by the contact tongues. In this manner a small contact resistance and hence a good electric contact are ensured.

The substantially even outer face of the resilient conductor clip permits the latter to be simultaneously used as a component in electric switches, particularly sliding switches.

Since after insertion of the resilient conductor clip 5, its web 14 is exposed at the top wall 2 of the chassis 1, contacting keys and other sheet metal contacts may be provided thereon for cooperation with the resilient connector clip.

A mounting of the resilient connector clips into the chassis by the manufacturer is not necessary since the purchaser may perform himself such an assembling operation by inserting the resilient connector clips into the compartments. The delicate springing contact tongues are protected by the clip housing; thus the resilient connector clip is, for all practical purposes, safely protected against mechanical damage. The resilient connector clip 5 may be securely, yet removably attached to the chassis 1 by virtue of the cooperation of the opening 19 provided in a side wall of the clip housing and a pin 21 attached to the wall of the compartment 4.

The resilient connector clip according to the invention ensures a secure electric contact because each conductor inserted thereinto (either through an aperture 13 or from the other side) is engaged, independently from its diameter, by its own associated two contact tongues 15, 16. In known connector clips two or more conductors are clamped together at the same location, resulting in loose, poor or entirely absent electric connections.

The serial arrangement of four apertures 13 in each resilient connector clip (wherein one contact tongue pair 15, 16 is associated with each aperture 13) is optimal with regard to the rectangular configuration of the conductor branches in the circuit diagrams, because in this manner the circuits may be built in configurations identical to those shown in the circuit diagrams. The predetermined diameter of the apertures 13 furthermore prevents the insertion of excessively thick conductors. In this manner an excessive stress on the contact tongues is avoided.

It will be understood that the above description of the present invention is susceptible to various modifications, changes and adaptations, and the same are intended to be comprehended within the meaning and range of equivalents of the appended claims.

It is to be understood that the resilient connector clip 5 may find application in electrical devices other than those described in the specification.

I claim:

1. A chassis assembly for removably supporting electric and electronic circuit components for forming circuits, comprising in combination:

a. a chassis having
   1. lateral wall means defining an open under-side, top wall means having an upper surface oriented outwardly and away from said open underside; said lateral and said top wall means together define an inner space;
   2. means defining compartments in said top wall means, said compartments being electrically insulated from one another and being open towards said underside and said upper surface;

b. a plurality of electrically conducting, resilient, one-piece connector clips held in said compartments, each said connector clip having
   1. spaced side walls, each having first and second ends;
   2. a web interconnecting said side walls at their first ends, said web being exposed outwardly at, and being substantially coextensive with, said upper surface; said side walls and said web forming a clip housing having an open side oriented away from said web and towards said inner space;
   3. means defining at least one throughgoing aperture in said web, said throughgoing aperture being arranged to present free access from said upper surface of said top wall means;
   4. at least two cooperating resilient contact tongues extending from said second ends of said side walls into said clip housing, each contact tongue having a free arcuate terminus, said cooperating contact tongues being arranged for receiving and holding conductors introduced into said clip housing through said aperture from said upper surface and through said open side from said inner space;
   5. means defining an opening in at least one of the side walls of said connector clip;

c. a pin projecting into at least one of said compartments, said pin being secured to the means defining said at least one of said compartments and snapping into said opening; and d. means defining a pocket in at least one of said compartments adjoining one of said side walls of said connector clip and presenting free access from said top surface for receiving therefrom and holding a metal member engaging face-to-face said one side wall of said connector clip.

2. In a chassis as defined in claim 1, wherein said side walls of said connector clip have a substantially even exterior, the improvement further comprising electric contact means interconnecting at least two said resilient connector clips.

3. In a chassis as defined in claim 2, said electric contact means being arranged to be stationary.

4. In a chassis as defined in claim 2, said electric contact means including a slidable contact member.

5. In a chassis as defined in claim 1, wherein each two cooperating resilient contact tongues form a contact tongue pair; the improvement further comprising means for separating each contact tongue pair from one another.

6. In a chassis as defined in claim 5, wherein with each said aperture provided in said web there is associated one of said contact tongue pairs.

7. In a chassis as defined in claim 6, wherein at least some of said resilient connector clips have four apertures and four contact tongue pairs.

8. In a chassis as defined in claim 1, the improvement further comprising securing means provided on said upper surface for immobilizing thereon an overlay containing the diagram of a circuit to be built; said resilient connector clips being arranged in said chassis so as to permit the disposition of circuit components thereon identically to the disposition of the circuit components illustrated on said overlay.

9. In a chassis as defined in claim 1, the improvement further comprising grooves of dovetail cross section provided externally in said lateral wall means of said chassis, said grooves being adapted to receive complementally shaped connecting members for attaching several chassis to one another.

10. In a chassis as defined in claim 1, wherein at least some of said apertures in said web are provided with tubular extensions oriented towards said cooperating contact tongues and forming guides for inserted terminals.

11. In a chassis as defined in claim 1, the improvement further including a plurality of receiving means provided in said chassis for supporting electrical and mechanical components.

* * * * *